WITNESSES:
Bernard R. Giegue
James F. Young

INVENTORS
Frederick O. Johnson &
Leo A. Finzi.
BY
Donald R. Lackey
ATTORNEY

United States Patent Office 3,444,455
Patented May 13, 1969

3,444,455
SOLID STATE MEANS FOR THE PREVENTION OF TRANSIENT SATURATION OF INDUCTIVE APPARATUS
Frederick O. Johnson, Monroeville, and Leo A. Finzi, Irwin, Pa., assignors to Westinghouse Electric Corporation, Pittsburgh, Pa., a corporation of Pennsylvania
Filed Feb. 14, 1967, Ser. No. 615,964
Int. Cl. H02p *13/04, 13/14, 13/16*
U.S. Cl. 323—18      7 Claims

ABSTRACT OF THE DISCLOSURE

An electrical circuit for preventing transient saturation of the magnetic core of electrical inductive apparatus, such as transformers, during the period of time between the closing of the switching means which connects the inductive apparatus with a source of alternating potential, and the reaching of a steady state flux condition in the magnetic core.

---

When a winding of electrical inductive apparatus of the type having a magentic core is first connected to a source of alternating potential, such as the primary winding of an electrical transformer, a transient condition may occur in which the magnetic core may saturate. Saturation of the magnetic core will cause the apparatus to draw excessive line current, and when the apparatus is a transformer, its secondary voltage may be adversely affected. This transient condition is due to the fact that the flux level in the magnetic core is not initially in a steady-state condition, when the supposedly steady-state line voltage is applied to the winding. Excessive line currents, even for a few cycles, are undesirable, especially when the switching means or line contactor is of the solid state type. Further, the effects of saturation on the secondary voltage are undesirable in certain applications, such as in X-ray power supplies.

One of the commonly used prior art methods of reducing this "turn-on" transient is to provide sensing means for determining the polarity of the last voltage half cycle applied to the inductive apparatus when it was disconnected from the source of alternating potential, and to reconnect the inductive apparatus to the source of alternating potential during a voltage half cycle of opposite polarity. This method, in addition to requiring costly and elaborate sensing and memory functions, has an accuracy dependent upon the transformer design and residual flux distribution. Further, this method becomes extremely complicated when applied to polyphase systems.

Accordingly, it is an object of the invention to provide a new and improved electric circuit for preventing transient saturation of the magnetic core of electrical inductive apparatus, when the apparatus is connected to a source of alternating potential.

Another object of the invention is to provide a new and improved electric circuit for preventing "turn-on" saturation of the magnetic core of electrical transformers, without requiring memory functions, and which has a repeatable accuracy not dependent upon transformer design and residual flux distribution.

Still another object of the invention is to provide a new and improved electric circuit for preventing the magnetic core of electrical apparatus from saturating when the apparatus is connected to a source of alternating potential, which circuit is applicable to both single and polyphase systems.

Briefly, the present invention accomplishes the above cited objects by establishing flux levels in the magnetic core of electrical inductive apparatus which correspond to those at a precise time under steady-state conditions, and to connect the electrical inductive apparatus to the source potential at this precise time. Thus electrical inductive apparatus immediately assumes steady-state conditions, eliminating the transition period during which transient saturation of the magnetic core may occur. The inveniton comprises an electrical circuit or system for accomplishing these functions, which includes, in addition to the electrical inductive apparatus and its associated line contactor, power supply means and sensing and firing control means. The power supply means is connected to a predetermined winding of the electrical inductive apparatus, and is pre-set to provide predetermined flux levels in the magnetic core which correspond to those existing at a predetermined point in the voltage waveform of the source potential. The sensing means provides a switching signal at this predetermined point in the voltage waveform, which is used to signal the line contactor to switch to its conductive condition, and connect the inductive apparatus with the source potential.

Further objects and advantages of the invention will become apparent from the following detailed description, taken in connection with the accompanying drawings, in which.

Figure 1:
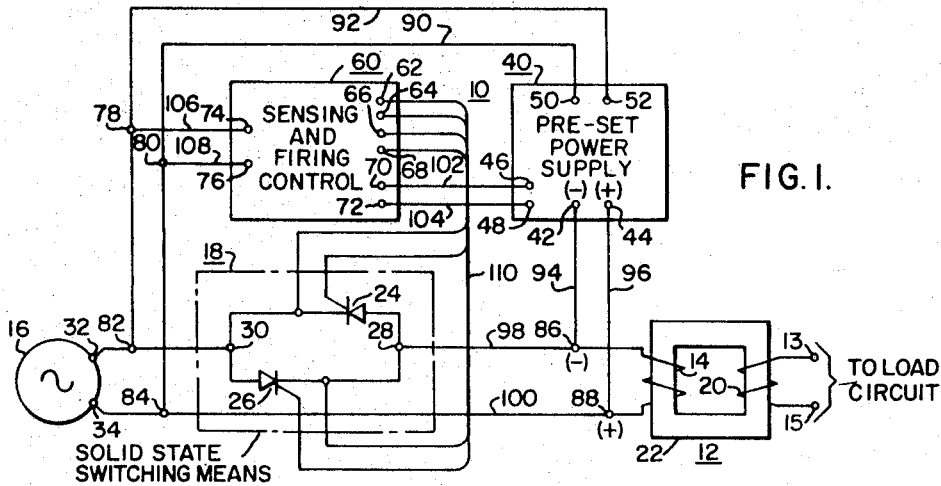
FIGURE 1 is a schematic diagram which illustrates the teachings of the invention applied to a single-phase transformer.

Referring now to the drawings, and FIG. 1 in particular, there is shown an electrical circuit 10 constructed according to the teachings of the invention, specifically applied to a single-phase transformer 12. Transformer 12 includes a primary winding 14 which is connected to a source 16 of alternating potential, through line contactor or switching means 18, and a secondary winding 20 which has output terminals 13 and 15 adapted for connection to a load circuit (not shown). Primary and secondary windings 14 and 20, respectively, are disposed in inductive relation with a magnetic core 22.

Line contactor or switching means 18 may be of the static or solid state type, utilizing back-to-back connected controlled rectifiers 24 and 26, such as silicon controlled rectifiers, as illustrated in FIG. 1; or, power transistors, gate controlled switches, or any suitable switching means capable of switching speeds which enable the contactor to respond immediately to a switching signal, may be used.

If switching means 18 includes back-to-back connected controlled rectifiers, the anode electrode of controlled rectifier 24 is connected to the cathode electrode of controlled rectifier 26, at terminal 28, and the anode electrode of controlled rectifier 26 is connected to the cathode electrode of controlled rectifier 24, at terminal 30. Terminal 28 is connected to primary winding 14, and terminal 30 is connected to output terminal 32 of source potential 16. The remaining output terminal 34 of source potential 16 is connected to the other side of primary winding 14. Thus, when switching signals are applied to controlled rectifiers 24 and 26, they will conduct on alternate half cycles to effectively connect the source potential 16 with primary winding 14. In the absence of switching signals, controlled rectifiers 24 and 26 will be in their nonconductive condition, effectively disconnecting transformer 12 from source potential 16.

When transformer 12 is initially connected to source potential 16, via switching means 18, the current and flux do not immediately assume their steady-state magnitudes. Instead, magnetic core 22 may saturate, which causes an initial current inrush, for several cycles of the supplied potential, with the magnitude of the current inrush and the number of cycles before reaching steady-state conditions, depending upon the residual flux distribution in the magnetic core and its direction with respect to the initial flux produced in the core by current flowing in winding 14, and the point on the voltage waveform at which the circuit was closed. Since this initial current inrush may be many times the normal full-load current of transformer 12, it is objectionable, and especially so when using solid state switching devices in line contactor 18. The inrush current may cause solid state devices to fail, or the solid state devices must be deliberately oversized to accommodate the current inrush transient, which adversely affects their cost, without insuring that the inrush transient will not be great enough under certain conditions to cause even the higher rated devices to fail. Further, if the contactor problem is solved, the current inrush is undesirable in many applications due to its adverse affect on the secondary voltage.

These disadvantages are overcome, according to the teachings of the invention, by utilizing an electrical circuit or system 10, which includes a pre-set power supply 40, and sensing and firing control means 60. The pre-set power supply 40 has output terminals 42 and 44 connected to winding 14 at junctions 86 and 88, respectively, which when energized, will provide a predetermined unidirectional current flow through winding 14. The magnitude of the predetermined unidirectional current flow through winding 14 is pre-set to provide a flux level in magnetic core 22 which corresponds to a predetermined time in the voltage wave cycle. It is, therefore, the function of the sensing and firing control means 60 to close line contactor 18 at this precise predetermined time in the voltage wave cycle.

Since the voltage from source potential 16, when applied to winding 14, and the flux generated in magnetic core 22 by current flow in winding 14 have the following relationships:

$$V_{16} = V_{max} \sin \omega t$$

$$\Phi_{22} = -\Phi_{max} \cos \omega t$$

at time $t=0$, the voltage wave is crossing zero in the increasing direction, from negative to positive, and the flux is $-\Phi_{max}$. Therefore, it is convenient to set the magnitude and direction of the unidirectional current flow through winding 14, provided by power supply 40, to establish a flux level in magnetic core 22 equal to $-\Phi_{max}$. This is accomplished by connecting output terminals 42 and 44 of power supply 40 to winding 14, with the polarity being such that the resulting current flow provides a flux direction the same as the direction generated by the source potential when it is going through zero from negative to positive. Thus, sensing and firing control means 60 should initiate switching signals, after receiving a signal from the operator to close the circuit, at the time in the voltage waveform when it is going through zero from negative to positive.

It should be understood that the polarity of power supply 40 may be reversed in its connections to winding 14, which would reverse the direction of current flow through winding 14 and provide a flux level of $+\Phi_{max}$.

In this instance, sensing and firing control means 60 should initiate switching signals when the source voltage is going through zero from positive to negative.

Pre-set power supply means 40, as will be hereinafter explained with reference to FIG. 4, may include a bridge rectifier, with its alternating current input terminals being connected to terminals 50 and 52, which are connected to source potential 16 via conductors 90 and 92 at junctions 84 and 82, respectively, or power supply means 40 may be any other suitable source of direct current potential.

Sensing and firing control means 60 has input terminals 74 and 76 connected to sense the waveform of source potential 16, via conductors 106 and 108, respectively, connected to conductors 92 and 90, respectively. When the waveform of the source potential goes through zero in a predetermined direction, depending upon whether the flux in the magnetic core 22 is pre-set to $-\Phi_{max}$ or to $+\Phi_{max}$, firing or switching signals are initiated at output terminals 62, 64, 66 and 68, which are connected to the gate-cathode electrodes of controlled rectifiers 24 and 26 via the conductors shown generally at 110. As will be hereinafter explained with reference to FIGS. 4 and 6, sensing and firing control means 60 may control the pre-set power supply 40, via conductors 102 and 104 connected between output terminals 70 and 72 of sensing and firing control means 60, and input terminals 46 and 48, respectively, of power supply 40. Thus, when the line contactor 18 is opened by sensing and firing control means 60, in response to a mechanical actuation by the operator, the pre-set power supply 40 may be automatically actuated to pre-set the flux in magnetic core 22. When the operator desires to close line contactor 18, which may be initiated by depressing a start button located in the sensing and firing control means 60, switching signals will be initiated at the first appropriate voltage zero, in which the voltage waveform crosses zero in the desired direction. Power supply 40 will be deenergized by the first voltage half cycle of the source potential which reverse biases its associated switching device, annd sensing and firing control means 60 will continue to supply switching signals until the operator pushes a stop button associated with the sensing and firing control means 60, which opens line contactor 18 and reenergizes power supply 40. Other suitable arrangements may be used, however. For example, when the operator pushes a start button to connect transformer 12 with source potential 16, this action may first energize power supply 40 to pre-set the magnetic core 22, and after a predetermined time delay, energize sensing and firing control means 60 at the first appropriate voltage zero, which will then deactivate power supply 40.

Figure 2:
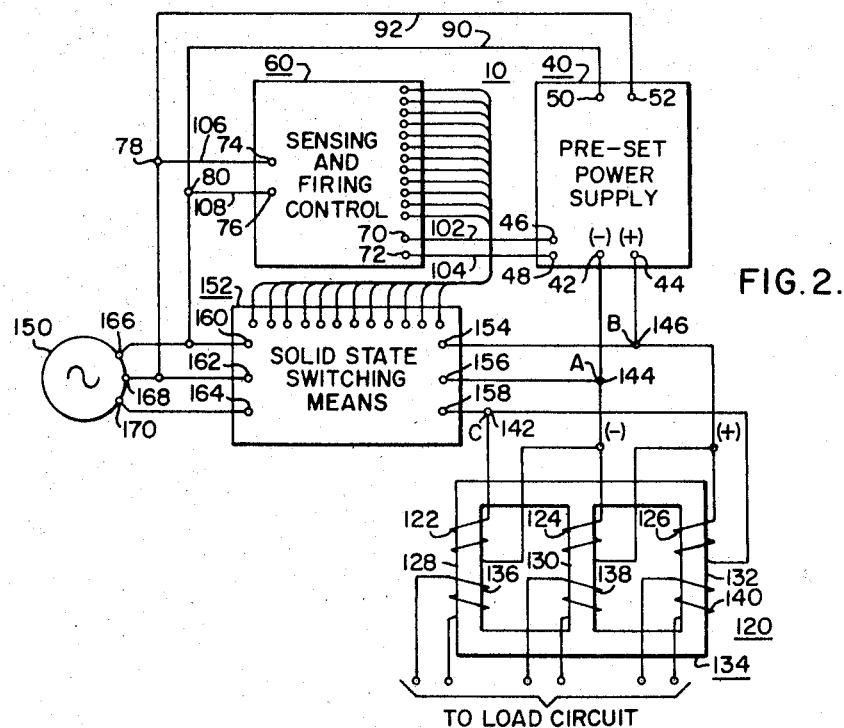
FIG. 2 is a schematic diagram which illustrates the teachings of the invention applied to a three-phase transformer, in which the primary phase windings are connected in delta.
Figure 3:
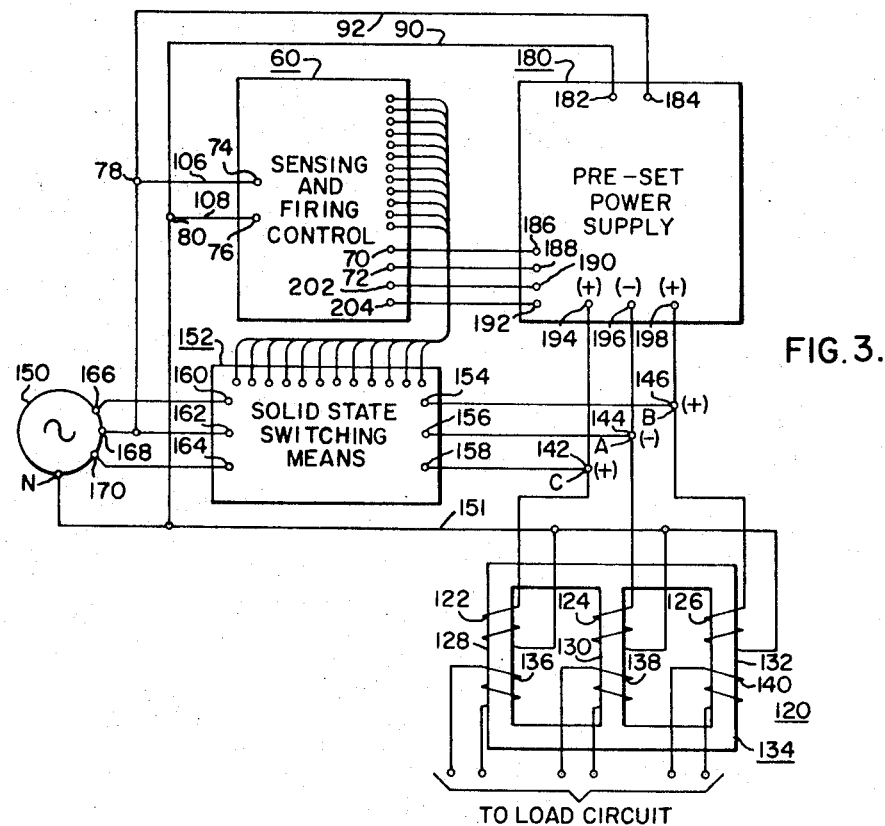
FIG. 3 is a schematic diagram which illustrates the teachings of the invention applied to a three-phase transformer, in which the primary phase windings are connected in Y.

The principles of the invention apply equally to three-phase transformers. FIGS. 2 and 3 are schematic diagrams illustrating how the invention may be applied to three-phase transformers having their primary phase windings connected in delta, and in Y, respectively. Like reference numerals in FIGS. 1, 2 and 3, as well as in the remaining figures, indicate like components.

Referring to FIG. 2, there is shown a three-phase transformer 120 having primary phase windings 122, 124 and 126 disposed in inductive relation with leg portions 128, 130 and 132 of magnetic core 134. Leg portions 128, and 132 thus form outer winding legs, and leg portion 130 forms the inner winding leg. Secondary windings 136, 138 and 140 may also be disposed on leg portions 128, 130 and 132, respectively, and the secondary windings may be interconnected in any desirable manner, for connection to a load circuit (not shown).

Primary windings 122, 124 and 126 are connected in a delta configuration at terminals 142, 144 and 146, and these terminals are connected to a source 150 of three-phase alternating potential through line contactor 152, which may be solid state switching means having back-to-back connected controlled rectifiers in each of the three conductors connected between source potential 150 and terminals 142, 144 and 146, in a manner similar to that described with reference to the switching means of FIG. 1. Thus, terminals 142, 144 and 146 are connected to terminals 154, 156 and 158 of switching means 152, and terminals 160, 162 and 164 of switching means 152 are connected to the output terminals 166, 168 and 170, of source potential 150.

The phase voltages, which in this instance are the same as the line voltages, have the following relationships, in which terminals 144, 146 and 142 are also given the letters A, B and C, respectively, to facilitate the identification of the electrical phases:

$$V_{AB} = V_{max.} \sin \omega t$$
$$V_{BC} = V_{max.} \sin (\omega t - 120°)$$
$$V_{CA} = V_{max.} \sin (\omega t - 120°)$$

The steady-state fluxes in the legs 130, 132 and 128, respectively, of magnetic core 134, have the following relationships:

$$\Phi 130 = -\Phi_{max.} \cos \omega t$$
$$\Phi 132 = -\Phi_{max.} \cos (\omega t - 120°)$$
$$\Phi 138 = -\Phi_{max.} \cos (\omega t - 120°)$$

Thus, at time $t=0$, voltage $V_{AB}$ is crossing zero in the increasing direction, and the flux in legs 130, 132, and 128 have the following steady-state relationships:

$$\Phi 130 = -\Phi_{max.}$$
$$\Phi 132 = +.5\Phi_{max.}$$
$$\Phi 128 = +.5\Phi_{max.}$$

Thus, by represetting the flux levels in legs 130, 132 and 128 to $-\Phi_{max.}$, $+.5\Phi_{max.}$, and $+.5\Phi_{max.}$, respectively, and by closing switching means 152 when voltage $V_{AB}$ goes through zero in the increasing direction, transformer 120 will immediately assume its steady-state condition, and magnetic core 134 will not saturate.

It should also be understood that the same result may be obtained by setting the flux levels in legs 130, 132 and 128 to $+\Phi_{max.}$, $-.5\Phi_{max.}$, and $-.5\Phi_{max.}$, respectively, and closing switching means 152 when voltage $V_{AB}$ goes through zero in the decreasing direction.

This specific presetting of the leg portions of magnetic core 134 is accomplished, according to the teachings of the invention, by electric circuit or system 10, which includes pre-set power supply 40, which may be the same as power supply 40 used with the arrangement of FIG. 1, and sensing and firing control means 60 which may also be the same as that used with the arrangement shown in FIG. 1, except for having additional output terminals for switching the additional solid state switching devices which are required in a three-phase line contactor. In other words, instead of having two solid state switching devices, as shown in FIG. 1, the three-phase contactor 152 would require six solid state switching devices, two in each of the line conductors, and thus will require twelve terminals on sensing and firing control means 60, and twelve input terminals on solid state switching means 152.

In the case of the single phase transformer, the preset power supply 40 was merely connected across the primary winding. In the case of a three-phase transformer, in which the primary phase windings are connected in delta, it is important that the pre-set power supply 40 be connected across the phase winding which is connected to the same phase of the source potential 150 being sensed by sensing and firing control means 60. Thus, terminals 42 and 44 are connected to terminals 144 and 146, respectively. This arrangement places the full output voltage of power supply 40 across winding 124. With the polarity connected as shown, with terminal 146 being positive and terminal 144 being negative, the direction of the flux will be in a first predetermined direction relative to the longitudinal direction of leg 130. It will be noted that this arrangement also connects windings 122 and 126 serially across output terminals 42 and 44, which provides half the current flow through these windings compared with winding 124, and the direction of the current flow through windings 122 and 126 is in a direction opposite to the direction of the current flow through winding 124. Thus, by connecting power supply 40 across winding 124 and adjusting the magnitude of current flow through winding 124 to provide a flux level equal to $\Phi_{max.}$, the flux level in the outer two legs will automatically be set by windings 122 and 126 to a magnitude of $.5\Phi_{max.}$, and the direction of the flux in legs 128 and 132 will be in a direction opposite to the direction of the flux in leg 130, with the direction of the flux in the legs being determined relative to the longitudinal dimension of the legs.

Sensing and firing control means 60 must then be connected to sense the same voltage as that which is applied across winding 124. This is accomplished via conductors 106 and 92 being connected to output terminal 168 of source potential 150, and conductors 108 and 90 being connected to output terminal 166 of source potential 150. Thus, when the operator wishes to connect transformer 120 to a source potential 150, and depresses a start button associated with the sensing and firing control means 60, power supply 40 sets the flux level in legs 128, 130 and 132, as hereinbefore described, and switching signals will be applied to switching means 152 at the first voltage zero of voltage $V_{AB}$, in which voltage $V_{AB}$ is going from negative to positive. If the polarity of the output voltage of power supply 40 is reversed across winding 124, then sensing and firing control means should be adapted to provide switching signals at the first voltage zero of voltage $V_{AB}$ in which the voltage is going from positive to negative.

It is to be understood that the flux in magnetic core 134 of FIG. 2 may also be set to flux levels which occur when voltage phase $V_{AC}$, or voltage phase $V_{BC}$ goes through zero in a selected direction. In these instances, the pre-set power supply 40 would be connected across phase winding 122, or phase winding 126, respectively, with the polarity being connected according to which zero crossing point of the voltage waveform is being sensed. Sensing and firing control means 60 would then be connected to sense the selected phase of source potential 150.

When the primary phase windings 122, 124, and 126 are connected in Y, instead of delta, the teachings of the invention may also be utilized, with FIG. 3 illustrating this embodiment of the invention. In FIG. 3, a neutral terminal N has been added to source potential 150, and the phase windings 128, 130 and 132 are connected in Y, with their neutrals being connected to terminal N via conductor 151.

When the primary windings of transformer 120 are connected in Y, the following relationships exist between the phase voltages, i.e., the line to neutral voltages:

$$V_{AN} = V_{max.} \sin \omega t$$
$$V_{BN} = V_{max.} \sin (\omega t - 120°)$$
$$V_{CN} = V_{max.} \sin (\omega t + 120°)$$

The steady-state flux levels in legs 130, 132 and 128 will be as follows:

$$\Phi_{130} = -\Phi_{max.} \cos \omega t$$
$$\Phi_{132} = -\Phi_{max.} \cos (\omega t - 120°)$$
$$\Phi_{128} = -\Phi_{max.} \cos (\omega t + 120°)$$

Thus, at time $t=0$, voltage $V_{AN}$=zero increasing, and $\Phi_{130} = -\Phi_{max.}$, $\Phi_{132} = +.5\Phi_{max.}$, and $\Phi_{128} = +.5\Phi_{max.}$. These flux levels may be pre-set by a power supply 180 which receives an alternating potential at input terminals 182 and 184, and provides a unidirectional output at terminals 194, 196 and 198, with terminals 194 and 198 being positive, and terminal 196 being negative. The negative terminal 196 is connected to the winding disposed on the inner leg of magnetic core 134, at terminal 144, which in this instance is winding 124, and the positive terminals are connected to windings 122 and 126, which are disposed on the outer legs, at terminals 142 and 146, respectively. This arrangement provides a current flow from terminal 142 through winding 122 and winding 124, with the flux produced in legs 128 and 130 being in opposite directions relative to the longitudinal dimension of their associated legs, and a current flow from terminal 146 through winding 126 and winding 124, with the flux again being in opposite directions relative to the longitudinal dimensions of the associated legs. The flux in leg 130 due to the two currents, however, is in the same direction, thus providing twice the flux magnitude in leg 130, compared to the magnitude of a flux in legs 128 and 132, and its direction is opposite to the direction of the flux in legs 128 and 132. Thus, magnetic core 134 may be pre-set to the flux levels existing at the time when voltage $V_{AN}$ is crossing zero in the increasing direction. By making terminal 144 positive, and terminals 142 and 146 negative, the core could be pre-set to the flux levels when voltage $V_{AN}$ goes through zero in the decreasing direction.

Sensing and firing control means 60 may be substantially the same as used in the arrangement shown in FIG. 2, except it should be connected to sense voltage $V_{AN}$, and it may have additional output terminals 202 and 204 for providing signals for switching the added rectifier section required in the pre-set power supply 180. Thus, power supply 180 may have input terminals 186, 188, 190 and 192, connected to output terminals 70, 72, 202 and 204, respectively, of sensing and firing control means 60.

The flux in magnetic core 132 of FIG. 3 may also be set to the flux levels which occur when phase voltage $V_{BN}$ or phase voltage $V_{CN}$ goes through zero in a predetermined direction. In these instances, pre-set power supply 40 would be connected to the line terminals of all of the phase windings, with the polarity connected to the line terminal of the selected phase winding being opposite to the polarities connected to the line terminals of the remaining two phase windings. Sensing and firing control means 60 would then be connected to sense the selected phase of source potential 150.

With a power supply having two positive and one negative output terminals, only one zero crossing direction may be sensed. If the other zero crossing direction is to be sensed, pre-set power supply 180 would have to have one positive and two negative terminals, whti the positive terminal being connected to the phase winding which is connected to the phase of the source potential whose zero crossing point is being sensed.

Figure 4:
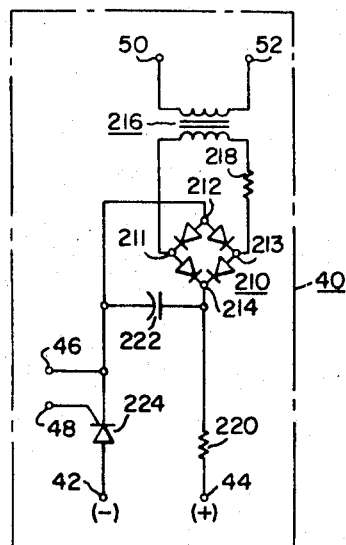
FIG. 4 is a schematic diagram of a pre-set power supply which may be used with the embodiments of the invention shown in FIGS. 1 and 2.

FIG. 4 illustrates a pre-set power supply 40 which may be used in the embodiments of the invention shown in FIGS. 1 and 2. In general, power supply 40 includes a full-wave, single-phase bridge rectifier 210 having alternating current input terminals 211 and 213 connected to terminals 50 and 52 through transformer 216, and direct current output terminals 212 and 214 connected to terminals 42 and 44, respectively, through a wave filter comprising resistors 218 and 220, a capacitor 222, and through a solid state switching device 224, such as a silicon controlled rectifier. When a switching signal from sensing and firing control means 60 is applied to controlled rectifier 224, power supply 40 will be activated. Power supply 40 will thus remain activated, presetting the magnetic core of the associated transformer, until such time as the switching means connects the source potential with the transformer. Power supply 40 will then automatically be deactivated, by the first voltage half cycle of the source potential which reverse biases controlled rectifier 224. Controlled rectifier 224 will then remain non-conductive until it again receives a switching signal at its terminals 46 and 48.

Figure 5:
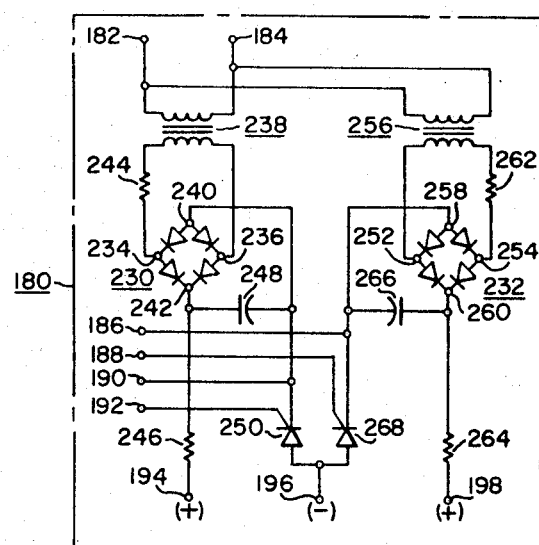
FIG. 5 is a schematic diagram of a pre-set power supply which may be used with the embodiment of the invention shown in FIG. 3.

FIG. 5 illustrates a pre-set power supply 180 which may be used in the embodiment of the invention shown in FIG. 3. Power supply 180 includes two full-wave, single-phase bridge rectifiers 230 and 232. Bridge rectifier 230 has alternating current input terminals 234 and 236 connected to terminals 182 and 184 through transformer 238, direct current output terminals 240 and 242 connected to output terminals 194 and 196, through a wave filter which includes resistors 244 and 246 and capacitor 248, and through a controlled rectifier 250. Bridge rectifier 232 has alternating current input terminals 252 and 254 connected to terminals 182 and 184 through transformer 256, and direct current output terminals 258 and 260 which are connected to output terminals 196 and 198 through a wave filter which includes resistors 262 and 264 and capacitor 266, and through a controlled rectifier 268. Thus, when sensing and firing control means 60 applies switching signals to controlled rectifiers 250 and 268 at input terminals 190 and 192, and 186 and 188, power supply 180 will be energized, providing a unidirectional potential at its output terminals 194, 196 and 198. Power supply 180 will remain energized until such time as source potential 150 is connected to transformer 120. The first voltage half cycle of source potential 150 which reverse biases controlled rectifiers 250 and 268 will switch them to their nonconductive conditions, and they will remain in that state until again receiving switching signals at their input terminals.

Figure 6:
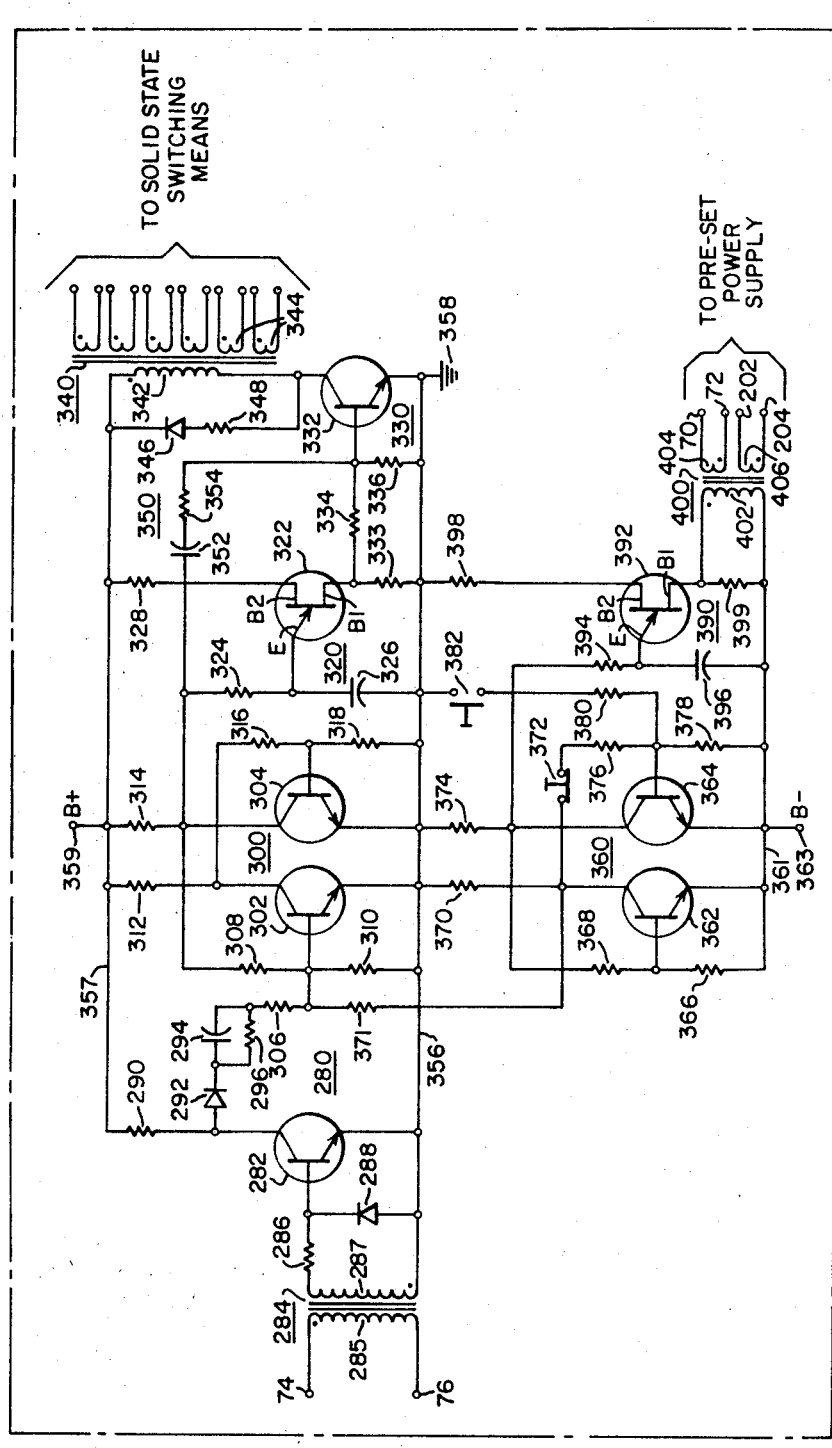
FIG. 6 is a schematic diagram of a sensing and firing control circuit which may be used with the embodiments of the invention shown in FIGS. 1, 2 and 3.

FIG. 6 is a circuit diagram of a sensing and firing control circuit which may be used for the sensing and firing control circuit 60 shown in FIGS. 1, 2 and 3. It will be understood, however, that FIG. 6 is merely illustrative of one of many different sensing and firing control arrangements which may be utilized.

In general, the sensing and firing control means 60 shown in FIG. 6 includes a pulse generating circuit 280, which in this instance delivers a pulse each time the potential connected to input terminals 74 and 76 goes through zero in an increasing direction, Pulse circuit 280 may also be set to provide pulses each time the source potential goes through zero in a decreasing direction, by changing the polarity of the secondary winding of transformer 284. More specifically, pulse generating circuit 280 includes a junction-type transistor 282, which may be of the NPN type shown, a transformer 284 having a primary winding 285, connected to input terminals 74 and 76, and a secondary winding 287 connected to the base and emitter electrodes of transistor 282. A resistor 286 may be connected in the base circuit, and a diode 288 may be connected across the emitter and base electrodes to limit the bias potential. Transistor 282 also includes a collector resistor 290 connected to conductor 357, which is connected to B+ at terminal 359. The pulse generating portion of pulse circuit 280 includes a diode 292, capacitor 294 and resistor 296. When the base electrode of transistor 280 is positive with respect to its emitter electrode, the B+ voltage will be shunted to the ground 358 through conductor 356. On the opposite half cycle, transistor 280 will be nonconductive, and a pulse will be generated by the parallel connected capacitor 294 and resistor 296. Pulse generating circuit 280 thus forms the sensing portion of the circuit, and it is continuously providing pulses, which are initiated by alternate half cycles of the supply potential. The remaining portion of the sensing and firing control circuit 60 includes a section for providing firing signals for the solid state switching means, and a section for providing firing signals for the pre-set power supply. In this arrangement the sections are energized alternately. The section for supplying switching signals for the solid state switching means includes a flip-flop circuit 300, a relaxation oscillator 320, an amplifier 330, and a pulse transformer arrangement 340. Flip-flop circuit 300 includes NPN junction type transistors 302 and 304, with the base electrode of transistor 302 being connected to the pulse generating circuit 280 through resistor 306, to ground 358 through resistor 310, and to the collector electrode of transistor 304 through resistor 308. The emitter electrode of transistor 302 is connected to ground 358, and its collector electrode is connected to B+ terminal 359 through resistor 312. Transistor 304 has its emitter electrode connected to ground 358, its base electrode connected to ground 358 through resistor 318 and to the collector electrode of transistor 302 through resistor 316, and its collector electrode is connected to B+ through resistor 314. Relaxation oscillator 320, which includes a unijunction transistor 322, is connected to flip-flop circuit 300 such that it provides output signals when transistor 302 is conductive and transistor 304 is nonconductive. Thus, the emitter electrode of unijunction transistor 322 is connected to the collector electrode of transistor 304 through resistor 324, and to ground through capacitor 326. Base 2 of unijunction transistor 322 is connected to B+ through resistor 328, and base 1 is connected to ground 358 through resistor 333. Output signals from relaxation oscillator 320 are taken from base 1 by amplifier 330, which includes a transistor 332, which may be of the NPN junction type having its base electrode connected to base 1 of unijunction transistor 322 through resistor 334, and to ground 358 through resistor 336. Its emitter electrode is connected to ground 358, and its collector electrode is connected to B+ through the primary winding 342 of pulse transformer 340. Pulse transformer 340 has a plurality of secondary windings 344, with the number of secondary windings depending upon the number of solid state switching devices to be switched in the solid state line contactor. A free wheeling diode 346 and resistor 348 may be serially connected across primary winding 342 to provide a discharge path for the energy stored in winding 342 when transistor 332 becomes nonconductive.

In order to eliminate any delay in the initial switching of transistor 332 to its conductive condition upon a change in the state of flip-flop circuit 300, this change in the condition of flip-flop circuit 300 may be coupled to the base electrode of transistor 332 through circuit 350, which includes capacitor 352 and resistor 354.

When the flip-flop circuit 300 is in the condition where transistor 302 is nonconductive and transistor 304 is conductive, unijunction transistor 322 will be nonconductive and transistor 332 will be nonconductive. Thus, in this state there will be no signals applied to the solid state switching means. When flip-flop circuit 300 switches to the opposite operating condition wherein transistor 302 is conductive and transistor 304 is nonconductive, unijunction transistor 322 will be energized, and provide pulses to amplifier 330, which in turn pulses the primary winding 342 of pulse transformer 340, and provides switching pulses for the solid state switching means. The values of resistors 324 and capacitor 326 should be chosen to provide a frequency of oscillation of at least 1000 Hz.

The second section of sensing and firing control means 60 includes a flip-flop circuit 360, a relaxation oscillator circuit 390, and a pulse transformer 400. Flip-flop circuit 360 includes NPN junction type transistors 362 and 364, with the collector electrode of transistor 362 being connected to conductor 356 through resistor 370, and to the base electrode of transistor 302 in flip-flop circuit 300, through resistor 371. The base electrode of transistor 362 is connected to the collector electrode of transistor 364 through resistor 368, and to terminal 363 which is the B— terminal, through resistor 366 and conductor 361. The emitter electrode of transistor 362 is connected to conductor 361. The base electrode of transistor 364 is connected to the collector electrode of transistor 362 through resistor 376 and push button 372, which is normally closed, to conductor 361 through resistor 378, and to ground 358 through resistor 380 and push button 382, which is normally open. The collector electrode of transistor 364 is connected to ground 358 through resistor 374, and the emitter electrode of transistor 364 is connected to conductor 361. The relaxation oscillator circuit 390 is connected to flip-flop circuit 360 such that it is oscillating when transistor 362 is conductive and transistor 364 is nonconductive. Relaxation oscillator circuit 390 includes unijunction transistor 392, which has its emitter electrode connected to the collector electrode of transistor 364 through resistor 394, and to conductor 361 through capacitor 396. Base 2 of unijunction transistor 392 is connected to ground 358 through resistor 398, and base 1 is connected to conductor 361 through resistor 399. The output signals from the relaxation oscillator circuit 390 are taken across resistor 399 by pulse transformer 400, which has its primary winding 402 connected across resistor 399. Pulse transformer 400 may have one or two output windings, depending upon whether there are one or two controlled rectifiers to be switched in the pre-set power supply. In the case of power supply 40, shown in FIG. 4, pulse transformer 400 would have a single output winding 404, and in the case of the power supply 180 shown in FIG. 5 power supply 400 would have an additional output winding 406.

In the operation of the sensing and firing control means 60, assume that transistor 362 of flip-flop circuit 360 is conductive and transistor 364 is nonconductive. In this condition, the voltage divider which includes resistors 306 and 371 is selected to provide insufficient base drive for transistor 302, which will then be cut-off and transistor 304 will be conductive. Relexation oscillator 390 will thus be operative, providing output signals to the pre-set power supply, and relaxation oscillator 320 will be inoperative, and will, therefore, not be supplying switching signals to the solid state switching means.

If the operator wishes to connect the transformer with the source potential, he will momentarily depress push button 382 which switches transistor 364 to its conductive condition and turns off transistor 362. The relaxation oscillator 392 will be deenergized and pulse transformer 400 will no longer provide signals for the pre-set power supply. With transistor 362 now being nonconductive, the pulses from pulse circuit 280 will render transistor 302 conductive and transistor 304 nonconductive, which energizes relaxation oscillator 320, and which also immediately turns transistor 332 "on" through capacitor 352 and resistor 354. The precise time at which transistor 330 is first rendered conductive will be a zero point on the voltage sensed by terminals 74 and 76, with the precise voltage zero being when the voltage waveform either goes from positive to negative or negative to positive, depending upon the polarity of winding 287 relative to winding 285 of transformer 284. Pulses from relaxation oscillator 322 will continue to switch amplifier 330 at the rate of its oscillation frequency, which will then pulse the solid state switching means associated with the line contactor. When the operator desires to disconnect the transformer from the source potential, he will momentarily depress push button 372 which switches transistor 362 to its conductive condition and transistor 364 to its nonconductive condition, which diverts the pulses originating in pulse circuit 280 through the transistor 362, and also causes flip-flop circuit 300 to switch to its other stable condition, as base drive current for transistor 302 from B+ is also diverted through transistor 362. Thus, relaxation oscillator 390 will again supply pulses to the pre-set power supply, and relaxation oscillator 320 will be deenergized.

In summary, there has been disclosed a new and improved electrical system for energizing electrical inductive apparatus, such as transformers, without saturating the magnetic core, even in transformers which have a marginal peak flux design and/or an unfavorable residual flux distribution. This new and improved electrical system operates without memory functions, and is equally applicable to single and polyphase transformer systems. The transformer iron or magnetic core is pre-set to a predetermined flux level prior to connecting the transformer to the source potential, with the pre-set power supply setting the flux levels to those steady-state values which occur at a predetermined time in the voltage waveform. The voltage waveform is sensed by the sensing and firing control means, and when the operator desires to close the line contactor, a push button, or other manual device is actuated, which provides switching signals to the line contactor at the first point in the voltage waveform which corresponds to the pre-set point. Thus, the transformer immediately assumes its steady-state operating condition, without saturating the magnetic core and without drawing an excessive line current. Thus, solid state switching devices may be used in the line contactor without danger of damage or failure due to "turn-on" transients, and the transformers may be used in power supplies associated with sensitive loads, such as X-ray equipment.

We claim as our invention:

1. An electrical circuit for connecting electrical inductive apparatus with a source of alternating potential without transient saturation of the inducive apparatus, comprising:

electrical inductive apparatus having a magnetic core and at least one phrase winding disposed in inductive relation therewith, switching means connected to said at least one phase winding, said switching means being adapted to connect said at least one phase winding with a source of alternating potential, power supply means connected to said at least one phase winding providing a predetermined unidirectional current flow therein, the magnitude of which establishes a predetermined flux level in said magnetic core which is substantially the same as the flux level in said magnetic core at a predetermined point in a voltage cycle of the alternating potential, and sensing means adapted for connection to the source of alternating potential, which provides a switching signal at said predetermined point in the voltage cycle of the alternating potential, said sensing means being connected to said switching means, with said switching means closing in response to the switching signal from said sensing means.

2. The electrical circuit of claim 1 wherein said switching means is of the solid state type.

3. The electrical circuit of claim 1 wherein the predetermined point in the voltage cycle of the alternating potential for which the flux level is established and at which said sensing means provides a switching signal, is that point when the alternating potential goes through zero in a predetermined direction.

4. The electrical circuit of claim 1 wherein said electrical inductive apparatus is three-phase, and is adapted for connection to a three-phase source of alternating potential through said switching means, said magnetic core having three winding legs, with at least one phase winding being disposed on each winding leg, said at least one phase winding on each winding leg being interconnected in a delta configuration, said power supply means being connected across a predetermined phase winding, to provide a unidirectional current flow in the phase windings which sets the flux level in the winding legs of said magnetic core to that corresponding to a predetermined zero crossing point of the alternating potenial connected to said predetermined phase winding, and said sensing means being adapted to sense the alternating potential which is connected to said predetermined phase winding, and provide a switching signal when said phase voltage crosses zero in a predetermined direction.

5. The electrical circuit of claim 4 wherein said switching means is of the solid state type.

6. The electrical circuit of claim 1 wherein said electrical inductive apparatus is three-phase and is adapted for connection to a three-phase source of alternating potential through said switching means, said magnetic core having three winding legs, with at least one phase winding being disposed on each winding leg, said at least one phase winding on each winding leg being interconnected in a Y configuration, having a neutral and three line terminals, said power supply means being connected to the line terminals of said three phase windings, with the polarity of the power supply means connected to a predetermined phase winding being opposite to the polarity of the power supply means connected to the remaining two phase windings, to provide a unidirectional current flow in the phase windings which pre-sets the flux level in the legs of said magnetic core to that corresponding to a predetermined zero crossing point of the phase voltage of the source of alternating potential which is connected to said predetermined phase winding, and said sensing means being adapted to sense said predetermined phase voltage of the source of alternating potential and provide a switching signal when said predetermined phase voltage crosses zero in a predetermined direction.

7. The electrical circuit of claim 6 wherein said switching means is of the solid state type.

References Cited

UNITED STATES PATENTS 3,171,079    2/1965    Mierendorf et al. _____ 323—58
3,374,421    3/1968    Ringelman _____ 317—50 X JOHN F. COUCH, *Primary Examiner.*

G. GOLDBERG, *Assistant Examiner.*

U.S. Cl. X.R.

307—104; 317—50; 323—24, 58